Nov. 29, 1949 | A. E. P. MILNER | Re. 23,176

APPLIANCE FOR MOLDING HOLLOW RUBBER BALLS AND THE LIKE

Original Filed March 26, 1940 | 3 Sheets-Sheet 1

INVENTOR.
ARTHUR EDWARD PEEL MILNER
BY Karl F. Ross
AGENT

Nov. 29, 1949 A. E. P. MILNER Re. 23,176

APPLIANCE FOR MOLDING HOLLOW RUBBER BALLS AND THE LIKE

Original Filed March 26, 1940 3 Sheets-Sheet 2

INVENTOR.
ARTHUR EDWARD PEEL MILNER
BY Karl F. Ross
AGENT

INVENTOR.
ARTHUR EDWARD PEEL MILNER
BY Karl F. Ross
AGENT

Reissued Nov. 29, 1949

Re. 23,176

UNITED STATES PATENT OFFICE 23,176

APPLIANCE FOR MOLDING HOLLOW RUBBER BALLS AND THE LIKE

Arthur Edward Peel Milner, Melbourne, Victoria, Australia, assignor to Swift Tennis Ball Company Proprietary Limited, Melbourne, Victoria, Australia, a company of Victoria Original No. 2,304,190, dated December 8, 1942, Serial No. 325,974, March 26, 1940. Application for reissue March 3, 1949, Serial No. 79,461. In Australia March 30, 1939

11 Claims. (Cl. 18—42)

This invention relates to improvements in appliances for moulding hollow rubber articles such as spherical balls and spherical or ovoid spray bulbs. In this specification the term "ball" is used for conciseness and is intended to include balls and other spherical or ovoid hollow articles formed by pressing suitable rubber stock around a core in a mold.

More especially this invention relates to improvements in a known molding appliance of the kind which includes a two part mold in each part of which is a cavity (the said cavities registering to form a molding chamber when the mold parts are closed together), a stem projecting from one part of the mold into the cavity therein, a core supported by the said stem and means to heat each mold part. In such known appliance rubber stock is molded around the core, (which is preheated) and cured, usually to the extent known as a light semi-cure after which the core (with the partly cured ball around it) is removed from the stem and the ball is then removed from the core. The arrangement of the core on the supporting stem and the removal of the core from the said stem cause undesirable wear and the repeated heating and cooling of the core also has undesirable results.

In a rubber ball for use in playing tennis it is very important that the wall of the ball shall be of equal thickness throughout, and that the finished ball shall be accurate as to weight, compression, flight and bounce. Any inaccuracy in the mold and/or any variation in the curing temperature may cause the production of faulty balls and with the known appliance the percentage of imperfect balls is undesirably high.

The primary object of this invention is to provide an improved molding appliance of the kind referred to with which hollow rubber balls of high quality may be produced rapidly and economically.

Another object of this invention is to provide an improved molding appliance of the kind referred to in which manual operations are reduced to a considerable extent, the possibility of error is obviated and the beforementioned disadvantages are avoided.

In an appliance for molding a hollow rubber ball according to this invention, the core is fixed relatively to a supporting stem, the said stem is movable relatively to the mold part with which it is associated (when the mold parts are separated) so that the core may be displaced and passages are provided through which suitable gas or vapour (such as air of steam) under pressure may be supplied to the interior of the ball on the said core to expand the ball to such an extent that it is displaced entirely or to such an extent that it may be removed readily. In this specification the term "air" is used for conciseness to include suitable gas or vapour.

An appliance for molding a hollow rubber ball according to this invention includes a mold that is formed of separable parts, a recess in each mold part arranged (when the mold parts are closed together) to form a molding chamber of suitable size and shape, a core of suitable size and shape, a stem on which said core is fixed, slidably arranged relatively to one of the said mold parts, the arrangement being such that when both mold parts are closed against each other the core will project within a fixed mold part but with clearance between it and the walls of the cavity of the latter; means whereby (when the mold sections are separated) the said core is moved away from the mold recess with which it is associated to the end that said core will have two positions within said mold sections or parts, one giving it uniform clearance therein and the other locating it in a raised position in its own mold part in which it is disposed, for the purpose to widen this clearance when the core thus moves away from its own cavity; this widened clearance thus effected between core and the walls of its own mold cavity allows sufficient play for the expanded walls of the finished rubber sphere in the immediate zone of the hole made in said sphere by the presence of the core stem therein, which action takes place as soon as air under pressure reacts against the walls of the rubber sphere from inside of the core; hence a passage through the said stem is provided and means to supply air under pressure through the said passages to the interior of a molded hollow ball on the said core. Means are provided whereby the core supporting stem may be adjusted relatively to the mold so that the position of the core relatively to the molding chamber may be accurately regulated. One or more recesses may be provided in the mold, each to form a wad or disc to be arranged in the hole formed in the ball by the core supporting stem.

A still further object of the present invention is to provide a means for molding hollow rubber balls and the like including a mold section having a hemispherical cavity, in which is disposed a spherical core, with means carried by the mold section designed to suport the core in said hemispherical cavity walls, and with further means arranged exteriorly of said core and adapted to cause the core to be supported eccentrically in said cavity to provide extra space in said cavity between core and cavity walls in which the rubber ball may dilate in the act of raising it pneumatically for extraction of the ball completely from said core.

But in order that this invention may be more readily understood a practical embodiment thereof will now be described with reference to the accompanying drawings in which.

Figure 1:
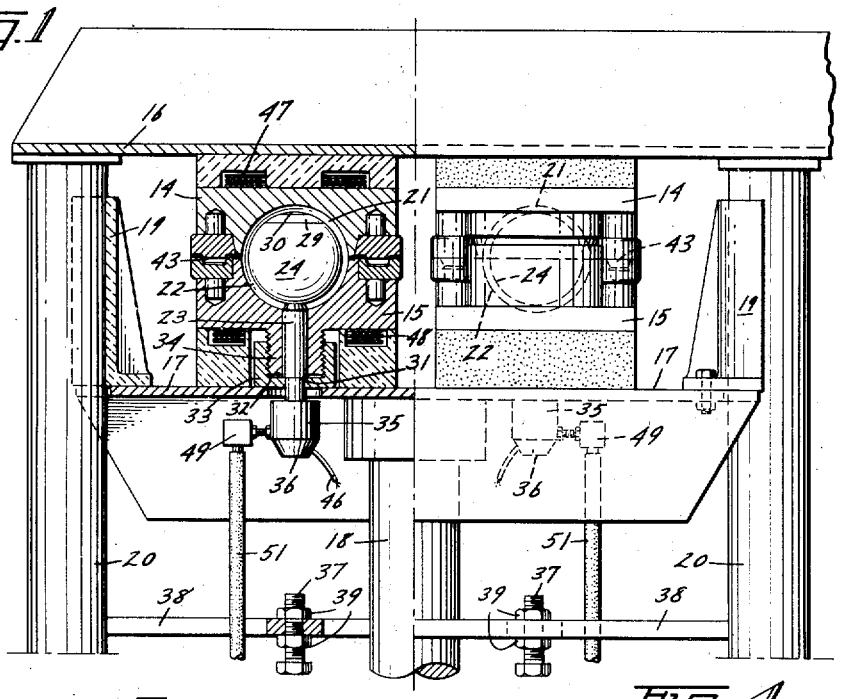
Fig. 1 is a side view partly in elevation and partly in vertical section, showing a two unit molding appliance with the mold parts in the closed position.
Figure 3:
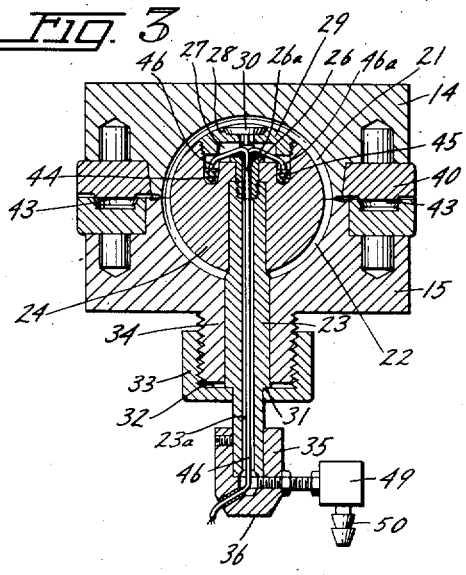
Fig. 3 is a vertical section of one of the molds shown in Fig. 1, on a larger scale.
Figure 4:
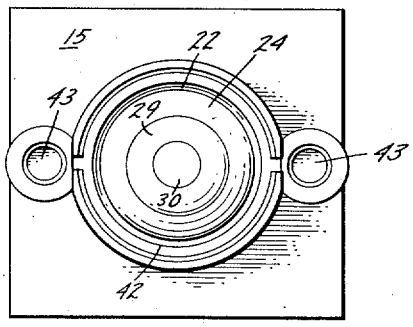
Fig. 4 is a plan of the upper face of the lower part of the mold shown in Fig. 3.
Figure 6:
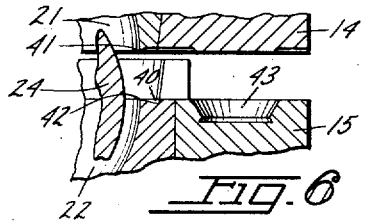
Fig. 6 is a large scale fragmentary vertical section of parts shown in Fig. 3, with the mold parts separated.

14 is the mold upper part and 15 the mold lower part. The mold upper part 14 is fixed relatively to framing 16 and the mold lower part 15 is mounted on a base 17 that is supported on a plunger 18. The said plunger is adapted to be actuated by any suitable well known means such as hydraulically operated mechanism (not shown) to reciprocate the said lower part 15 relatively to the said upper part 14 at timed intervals. Shoes 19 on the base 17 slidably engage bars 20 to guide the base 17. The arrangement shown in Figs. 1 and 2 includes two molds but it will be understood that each assembly may include only one mold or more than two molds. Hemispherical recesses 21, 22 in the respective mold parts 14 and 15 are arranged in registry so that each pair of recesses forms a spherical chamber when the mold parts are closed together.

A hollow stem 23 is slidably arranged in each movable mold part 15 and a core 24 is fixed on each said stem by a nut 26, the head of which is housed in a clearance 27 in the said core. An outlet 28 in a cap piece 29 above the clearance 27 is closed by a valve 30.

A shoulder 31 on the exterior of the hollow stem 23 seats on landing 32 when the said stem is in the normal position. Landing 32 is part of a nut 33 screwed on a neck 34 on the mold part 15, and is adjustable relatively thereto. The lower face of the nut 33 is arranged to abut against the base 17 when the mold parts are closed together (see Fig. 1) and so relieve pressure on the screw thread of the said nut during molding.

A cap 35 on the lower end of the stem 23 has a striking face 36 that is adapted to contact with a stop 37 when the mold part 15 is in the lowest position. Stop 37 is adjustable relatively to a frame member 38 and is fixed in adjusted position by nuts 39.

Spew ways 40 permit excess rubber to flow from the mold chamber formed by the recesses 21, 22. The edge parts 41, 42 of the mold parts 14 and 15 respectively are arranged to sever the rubber web extruded between adjacent faces of the mold parts. A small mold cavity 43 in each spew way is filled with rubber, to form a flat wad or disc 62 that may be used to fill the hole **61*a* formed by the stem 23 in a molded shell 61**.

An electrical element 44 is arranged in a groove 45 at the lower part of the clearance 27. An electrical conductor 46 to connect the element 44 to an electric circuit passes through the hollow core supporting stem and is suitably insulated therefrom. Another conductor **46*a* is grounded to the core 24. The conductor 46 may be connected to a low voltage circuit that is controlled by a resistor in known manner. The electrical heating element 47 is arranged above the upper mold part 14 and another electrical heating element 48 is arranged below the lower mold part 15** so that each said mold part may be heated to the desired temperature which may be thermostatically controlled in known manner.

In the arrangement shown in Figs. 1 to 3 and Figs. 9 to 12, a connector 49 on the cap 35 carries a nipple 50 from which a flexible tube 51 extends to a supply of air under pressure that may be controlled manually or in any other suitable manner. The interior of cap 35 is connected by a passage **23*a* in the stem 23, and a passage 26*a* through nut 26 to a chamber 27**.

I will now describe the operation of my invention. From inspection of the figures of the drawings it is seen while one mold section 14 remains stationary at the upper part of the framework supporting same (Figure 2), the other mold section 15 is free to move towards and from mold section 14 in unison with the movement imparted to the plunger and carriage supporting mold section 15. It will also be observed that adjustable screw stop 37 is stationary, remaining fixed upon frame member 38. In its uppermost position of movement cap 35 of core stem 23 is spaced above and out of contact with the screw stop 37 (Figure 1), at which time mold section 15 is closed against mold section 14.

The first requisite for an efficient mold of the rubber ball around the core and in the closed mold sections is that the core 24 be spaced uniformly, as to the matter of clearance, apart from the walls of recess or cavity 22 in mold section 15 to insure that the rubber shell will be of a uniform thickness, especially because it is possible to adjust its position in mold section 15, due to the existence of the threaded boss or neck 34 depending from mold section 15, which boss is screwed home into the nut 33 which rests upon the base 17 of the movable carriage having the shoes or slide runners 19. This having been done the next step consists in sliding the carriage base 17 downwardly so as to separate the two mold sections 14 and 15.

Figure 9:
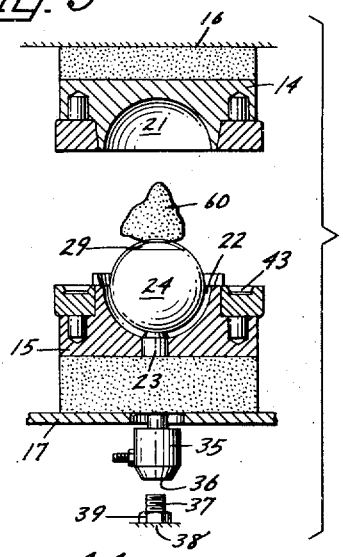
Fig. 9 is a diagrammatic vertical section showing a mold in the open position (that is with the mold parts separated) with a block or rubber stock on the core.

A suitable quantity of rubber stock is now taken (which may be preheated) and placed directly around and on the core, Figure 9, either during an interval of rest or in the act of moving the lower mold section 15 to closed position against fixed mold section 14. It is preferred to employ a conical or pyramidal plug 60 shown in Figure 9 which insures that the flow of rubber will be facilitated. As the molds close the electrical circuit is closed to the coils or elements 48 and 44 in the mold sections and core respectively in order to heat the rubber stock to a plastic state so that it may flow and be distributed uniformly around the core until the molding chamber is filled completely in a way to shape out the cylindrical hollow rubber ball 61. The mold parts 41 and 42 sever any spew or any fin that may remain, because the latter is usually of thin texture near the ball 61 as to readily permit instant detaching. The means to actuate the plunger may be caused to be arranged so that the lower mold section 15 will, for a short interval, rest just before it is completely closed to ensure that the rubber will be heated sufficiently to cause the mobile rubber to flow so as to fill all parts of the mold chamber contributed by both closed mold sections.

The molds are held in closed relationship for as long a period of time as will enable those skilled in the art to cure the rubber to the desired extent, after which the lower mold section 15 will be separated from the fixed section 14 by a downward movement being imparted to base 17.

Figure 2:
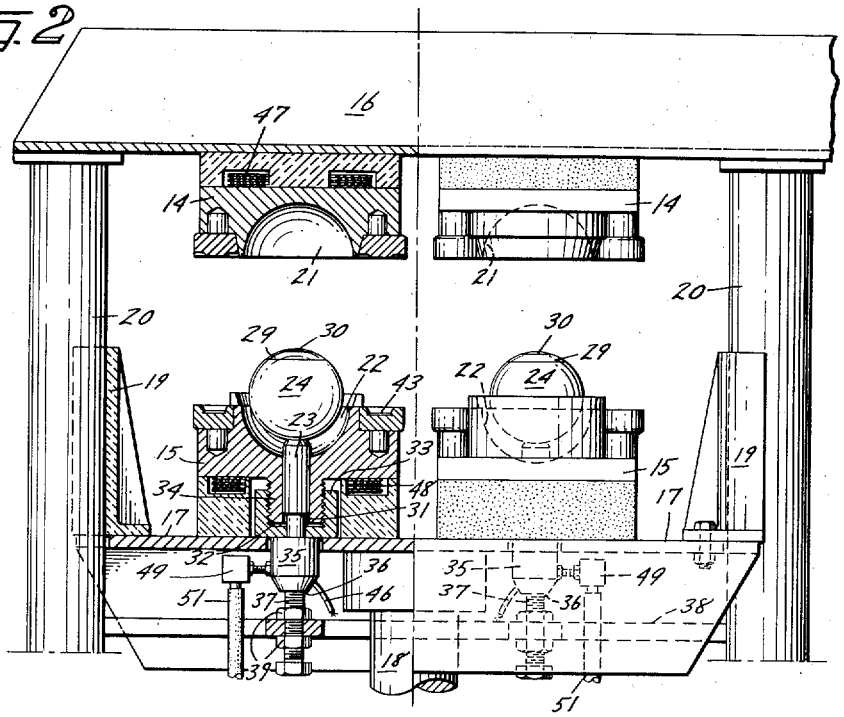
Fig. 2 is a similar view to Fig. 1 but with the mold parts separated.
Figure 5:
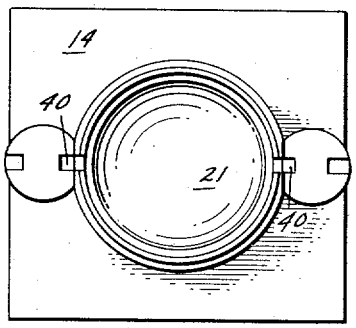
Fig. 5 is an inverted plan of the under face of the upper part of the mold shown in Fig. 3.
Figure 10:
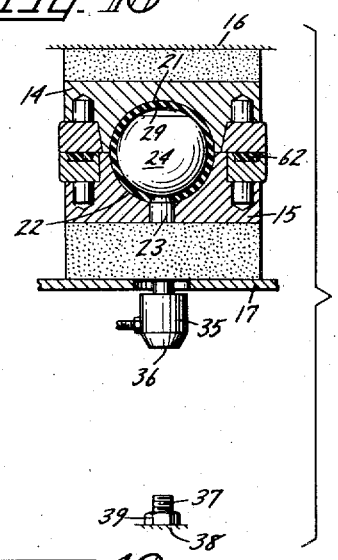
Fig. 10 is a similar view to Fig. 9 but with the mold parts closed together and with the rubber stock molded to form a ball on the core.
Figure 11:
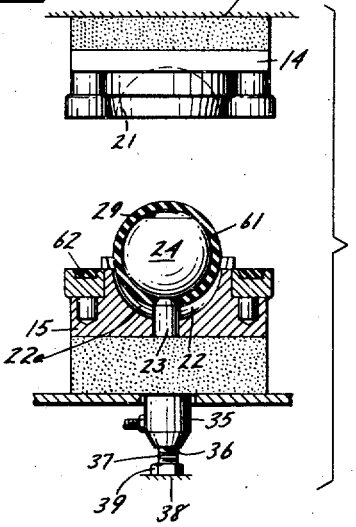
Fig. 11 is a similar view to Fig. 9 (but showing the mold upper part in elevation) with the mold parts separated and the core displaced relatively to the mold lower part.

The lower mold section 15 is carried downwardly to a point where, Figure 2, the cap 35 at the bottom of core stem 23 comes to rest upon the top of screw stop 37. Thereupon as the base 17 continues to move downwardly a little distance further it will be seen that the cavity or recess 22 in lower mold section 15 becomes increased in width or depth with respect to the lower hemisphere of the core 24 as is clearly shown in Figure 2. In this manner the mold section 15 has moved axially of the core 24, and has displaced the core from its mold together with its rubber shell 61, as shown in Figure 11. Previously, as is illustrated in Figure 10, while both mold sections were yet closed, the rubber shell or ball 61 was disposed concentrically in the mold chamber, but now, in Figure 11, it has assumed an eccentric position in said mold chamber, so that a virtually crescent shaped cavity is present between the lower hemispherical surface of rubber shell 61 and the adjacent walls of the cavity 22 of the lower mold section 15.

Figure 7:
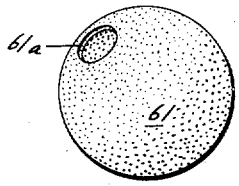
Fig. 7 is a perspective view of a ball produced in a mold of the kind in Figs. 1 to 6.
Figure 8:
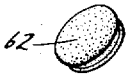
Fig. 8 is a perspective view on a larger scale, of a closure wad or plug for the hole in the ball shown in Fig. 7.

This widened crescent-shaped cavity is necessary in order to allow for compensating the expansion of the perforated area or zone of the rubber shell 61, for, where stem 23 passes through this shell the hole 61*a* is present at the bottom of this shell as shown in Figure 7. In the act of pressing the edge of this rubber ball hole over the gradually bulging convex surface of the lower hemisphere of the core 24 the flexible rubber shell moves towards and aganst opposite points of a chord—in other words laterally and outwardly of the core stem 23. This calls for additional space for this to take place in and the crescent shape cavity, Figure 11, provides just such space.

Figure 12:
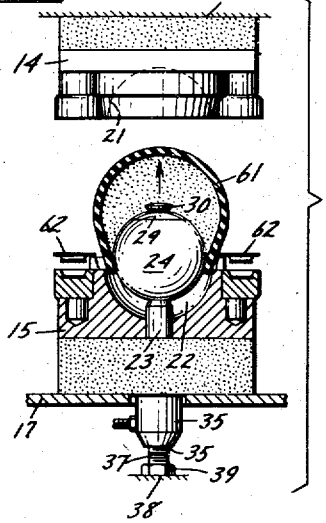
Fig. 12 is a similar view to Fig. 11 but with the molded ball expanded by air pressure and displaced from the core so that it may be moved readily.

At this point the operator causes a flow of air under pressure to start in flexible hose 51, whereby air under pressure enters bore 23*a* of the hollow stem 23 and emerges through port or outlet 28 in the cap piece 29, after lifting and opening valve 30. The compressed air thereupon escapes and presses against the adjacent surface of the rubber shell 61 causing the shell to be inflated and raised as shown in Figure 12, and as this takes place, the perforated bottom of the shell is forced to expand abruptly so hole 61*a* in the rubber shell is enlarged sufficiently to allow the perimetral edge thereof to ride upon the convex surface of the core 24 executing a movement laterally and upwardly in the crescent shaped cavity 22*a*. In this manner when the parts are in the position shown in Figure 12 the operator may readily lift the rubber sphere easily off the core, completely extracting same. It will be seen that the widening of the cavity 22 occurs automatically as the mold sections 14 and 15 separate the proper distance.

The ram 18 may be controlled in such manner that the parts are actuated in a timed cycle in manner well understood and a plurality of molds may be arranged to operate in timed relationship, in such manner that there is little or no loss of time during the cycle of operations.

I do not intend to confine myself to the exact details of construction set forth herein save as pointed out in the appended claims.

What I claim is:

1. Apparatus for molding a hollow rubber ball or the like, of the kind in which plastic rubber stock is molded around a core supported in a chamber in a mold formed of separable sections, said apparatus comprising a support projecting through one section of said mold into the same and movable relative to the mold, a core fixed on the inner end of said support, the said core and the said support being formed with air passages to admit air under pressure to the interior of a ball or the like on the said core to expand the said ball or the like and cause it to be displaced relatively to the said core, and a member adjustable relative to the mold section through which the said support projects, the said member being arranged to form a seating for said core support when the latter is in molding position.

2. An apparatus for molding a hollow rubber ball or the like as claimed in claim 1, in which the section of the mold having said support projecting therethrough is movable and has a neck through which the said support passes and a flanged sleeve adjustably mounted on the said neck, said support having a shoulder adapted to seat on the flange of said sleeve when the core is in the molding position.

3. Apparatus for molding a hollow rubber ball or the like comprising a mold formed of separable sections including a fixed part and a movable part, a mold chamber in the said sections, a core arranged in the said chamber, a support for the core, the core being fixed on the said support, the latter projecting through and being axially movable relative to said movable part of the mold, a member adjustable relative to the movable mold part, said member being arranged to form a seat for said core support when the mold is in molding position, a passage through the said core and the said support through which air under pressure may be admitted to the interior of the ball or the like on the said core, and means to move the core support axially relative to the movable mold part when the latter approaches the full open position.

4. Apparatus for molding a hollow rubber ball or the like comprising a two part mold the upper part of which is fixed and the lower part of which is movable relative to the said fixed part, each mold part being provided with a recess to form a molding chamber when the said mold parts are closed together, a core, a support for the said core, said support projecting slidably through the movable mold part, a member adjustable relative to the movable mold part, said member being arranged to form a seat for said core support when the mold is in molding position, an air passage through the said support and the said core and a valve to close the outlet end of the said passage, the said valve when closed forming part of the molding face of the said core.

5. Apparatus for molding a hollow rubber ball or the like comprising a two part mold the upper part of which is fixed and the lower part of which is movable relative to the said fixed part, each mold part being provided with a recess to form a molding chamber when the said mold parts are closed together, a core, a support for the said core, said support projecting slidably through the movable mold part, a member adjustable relative to the movable mold part, said member being arranged to form a seat for said core support when the mold is in molding position, an air passage through the said support and the said core and a valve to close the outlet end of the said passage, the said valve when closed forming part of the molding face of the said core, an abutment face on the lower end of the core support, and an adjustable stop arranged to cooperate with said abutment face and to move the core support axially relative to the movable mold part when the latter approaches the full open position.

6. In a device as described a spherical core, a pair of relatively movable mold sections having hemispherical cavities enclosing spacedly said core when they are closed against each other, a slidable support for one of said sections carrying it to open or closing position relative to the other mold section, said support having an opening, a cap nut mounted so as to cover said opening, a tubular boss depending from the latter mold section adjustably threaded into said cap nut, a stem depending from said core which projects into said tubular boss slidably, said stem and said core having a continuous air passage therein having a shoulder resting on the bottom of said cap nut and having a terminal projecting slidably through said support opening, the wall of said cavity of the last named mold section being moved variably towards said core when adjusted in said cap nut, and means engaging the terminal of said core stem as said mold sections separate to raise said stem and core.

7. In combination with a pair of relatively movable mold sections for molding a rubber ball or the like, a substantially spherical core having a cavity and a bore communicating therewith, said cavity being formed with an annular recess, a heating coil in said annular recess, a cap piece threaded into said cavity and overlying said heating coil, said cap piece being provided with an air port communicating with said bore, a tubular stem fixed in said bore and slidably extending through one of said mold sections, the interior of said stem communicating with said cavity, valve means loosely seated in said air port and adapted to rise under the pressure of air admitted into said stem, thereby allowing the air thus admitted to escape from said cavity, electrical wire means connected to said heating coil and extending outwardly through said stem, and a member adjustable relative to said one of said mold sections and forming a seating for said stem to center said core with respect to said mold sections.

8. The combination according to claim 7, comprising a tubular insert extending into said bore and threadedly gripping said stem, said insert being provided with a flange engaging the bottom of said cavity, thereby securing said stem to said core.

9. In a device as described, in combination, a pair of relatively movable mold sections provided with complemental, substantially hemispherical cavities, a substantially spherical core of a radius less than that of said cavities between said sections, a stem depending from said core and slidably seated in one of said mold sections, a member adjustable relative to said one of said mold sections, said member forming an abutment for said stem to center said core with respect to said mold sections, said stem and core being provided with a through-going air channel, and stop means acting upon said stem on separation of said mold sections to displace said core relative to said one of said mold sections to widen the clearance between the latter and said core, thereby facilitating the removal of a molded object from said core by the admission of air under pressure through said channel.

10. The combination according to claim 9 wherein said core is provided with a recess opposite said stem, said recess communicating with said channel, said core being provided with a valve member loosely seated in said recess and adapted to rise under the pressure of said air to allow the escape of the air from said channel, said valve member when fully retracted into said recess being substantially flush with the surface of said core.

11. The combination according to claim 10, comprising electrical heating means lodged in said recess underneath said valve member, and electrical wire means connected to said heating means, said wire means extending outwardly through said stem.

ARTHUR EDWARD PEEL MILNER.

REFERENCES CITED

The following references are of record in the file of this patent:

UNITED STATES PATENTS

| Number | Name | Date |
|---|---|---|
| 1,040,737 | Murray | Oct. 8, 1912 |
| 1,559,884 | Kosch | Nov. 3, 1925 |
| 1,639,430 | Gammeter | Aug. 16, 1927 |
| 2,100,832 | Bratring | Nov. 20, 1937 |